United States Patent
Yoon

(10) Patent No.: US 6,697,083 B1
(45) Date of Patent: Feb. 24, 2004

(54) APPARATUS AND METHOD FOR DISPLAYING INFORMATION IN FOLDER TYPE COMMUNICATION TERMINAL

(75) Inventor: Kyeong-Cheol Yoon, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/434,638

(22) Filed: Nov. 5, 1999

(30) Foreign Application Priority Data

Nov. 5, 1998 (KR) .............................. 98-47749

(51) Int. Cl.⁷ ................................. G09G 5/34
(52) U.S. Cl. ....................... 345/658; 455/566
(58) Field of Search .................. 345/649, 656, 345/657, 658, 659, 173, 176, 156, 168, 169, 1.1, 1.3, 2.1, 2.2, 2.3; 455/566, 556, 557, 575

(56) References Cited

U.S. PATENT DOCUMENTS

| 4,947,344 A | * | 8/1990 | Hayashi et al. | |
| 5,347,630 A | * | 9/1994 | Ishizawa et al. | |
| 5,537,474 A | | 7/1996 | Brown et al. | ............. 380/23 |
| 5,798,750 A | * | 8/1998 | Ozaki | ............. 345/656 |
| 5,896,575 A | * | 4/1999 | Higginbotham et al. | .... 455/566 |

FOREIGN PATENT DOCUMENTS

| EP | 0 521 609 A2 | 1/1993 | ............ H04Q/7/04 |
| WO | WO 98/38822 | 9/1998 | |

OTHER PUBLICATIONS

Chinese First Office Action dated Aug. 15, 2003, issued in a counterpart application, namely, Appln. No. 99123506.1.

* cited by examiner

Primary Examiner—Chanh Nguyen
(74) Attorney, Agent, or Firm—Dilworth & Barrese LLP

(57) ABSTRACT

An apparatus for and a method of displaying information in a folder type communication terminal provided with a folder in such a fashion that the user can view the displayed information even in a closed status of the folder. A transparent LCD is fixedly mounted in an opening formed through a portion of the folder so that an image indicative of the information to be displayed is viewed in either the open or closed status of the folder. The present invention provides a configuration capable of controlling the transparent LCD in such a fashion that the image is displayed in a normal status in either the open or closed status of the folder. A folder-sensing unit detects whether or not the folder is open or closed. Based on the result of the detection, the transparent LCD is controlled to display the image in a normal status thereon in the sensed status of the folder.

5 Claims, 6 Drawing Sheets

APPARATUS AND METHOD FOR DISPLAYING INFORMATION IN FOLDER TYPE COMMUNICATION TERMINAL

BACKGROUND OF THE INVENTION

1. Field of the Invention

The present invention relates to an apparatus for and a method of displaying information in a folder type communication terminal, and more particularly to an apparatus for and a method of displaying information in a folder type communication terminal provided with a folder in such a fashion that a user can view the displayed information even when the folder is closed.

2. Description of the Related Art

Generally, folder type communication terminals are constructed to have a reduced volume while having keys and an LCD display screen, the sizes of which are equal to or larger than those of bar type and flip type communication terminals.

Even in a folder type communication terminal having the advantages described above, however, there exists a problem in that the user can view the display screen of the terminal only when the folder of the terminal is open. That is, in a closed status of the folder, the user cannot view the display screen. Therefore, the user cannot immediately view information displayed on the display screen, for example, information about the possibility of communication, consumption of battery power, time, date, etc. in a closed status of the folder. To the user's disadvantage, he must first open the folder in order to view the information.

SUMMARY OF THE INVENTION

The present invention overcomes the above-described problems. Therefore, it is an object of the present invention to provide an apparatus for displaying information in a folder type communication terminal, which is capable of allowing a user to view information displayed on a display screen although the folder of the terminal is not open.

It is another object of the present invention to provide an apparatus for displaying information in a folder type communication terminal, which is capable of allowing the user to view information displayed in either the open or closed status of the folder of the terminal while using a single display unit mounted to the folder of the terminal.

It is yet another object of the present invention to provide an apparatus for displaying information in a folder type communication terminal configured to allow the user to view information displayed in either the open or closed status of the folder of the terminal, whereby the apparatus is capable of displaying information in the form of a normal-status image in either the open or closed status of the folder while using a single display unit mounted to the folder.

To accomplish the above objects of the present invention, a transparent LCD is fixedly mounted in an opening formed through a portion of the folder so that an image of the information to be displayed is viewed in either the open or closed status of the folder. A circuit configuration is also provided which is capable of controlling the transparent LCD in such a fashion that the image is displayed in a normal status in both the open and closed status of the folder. A folder-sensing unit detects whether or not the folder is open or closed. Based on the result of the detection, the transparent LCD is controlled to display the image in a normal status for the sensed status of the folder.

BRIEF DESCRIPTION OF THE DRAWINGS

The above objects and advantages of the present invention will become more apparent by describing in detail preferred embodiments thereof with reference to the attached drawings in which:

FIG. 5a shows an image displayed in a normal status on the LCD in the open status of the folder, whereas FIG. 5b shows an image displayed in an inverted status on the LCD in the closed status of the folder.

DETAILED DESCRIPTION OF THE PREFERRED EMBODIMENT

Preferred embodiments of the present invention will be described in detail with reference to the attached drawings. It is to be noted that a detailed description of a known function or structure of the present invention will be omitted if it is deemed to obscure the subject matter of the present invention.

Figure 1:
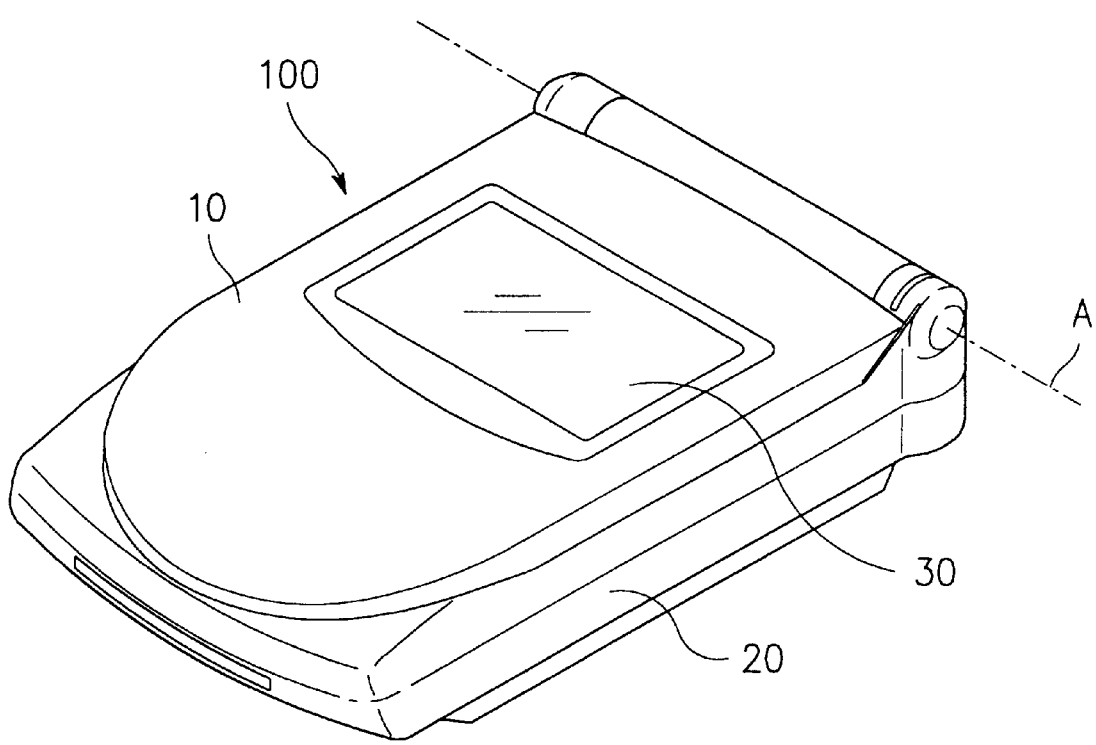
FIG. 1 is a perspective view of a folder type communication terminal according to an embodiment of the present invention, in which a folder having a transparent LCD mounted therein is in a closed status.
Figure 2:
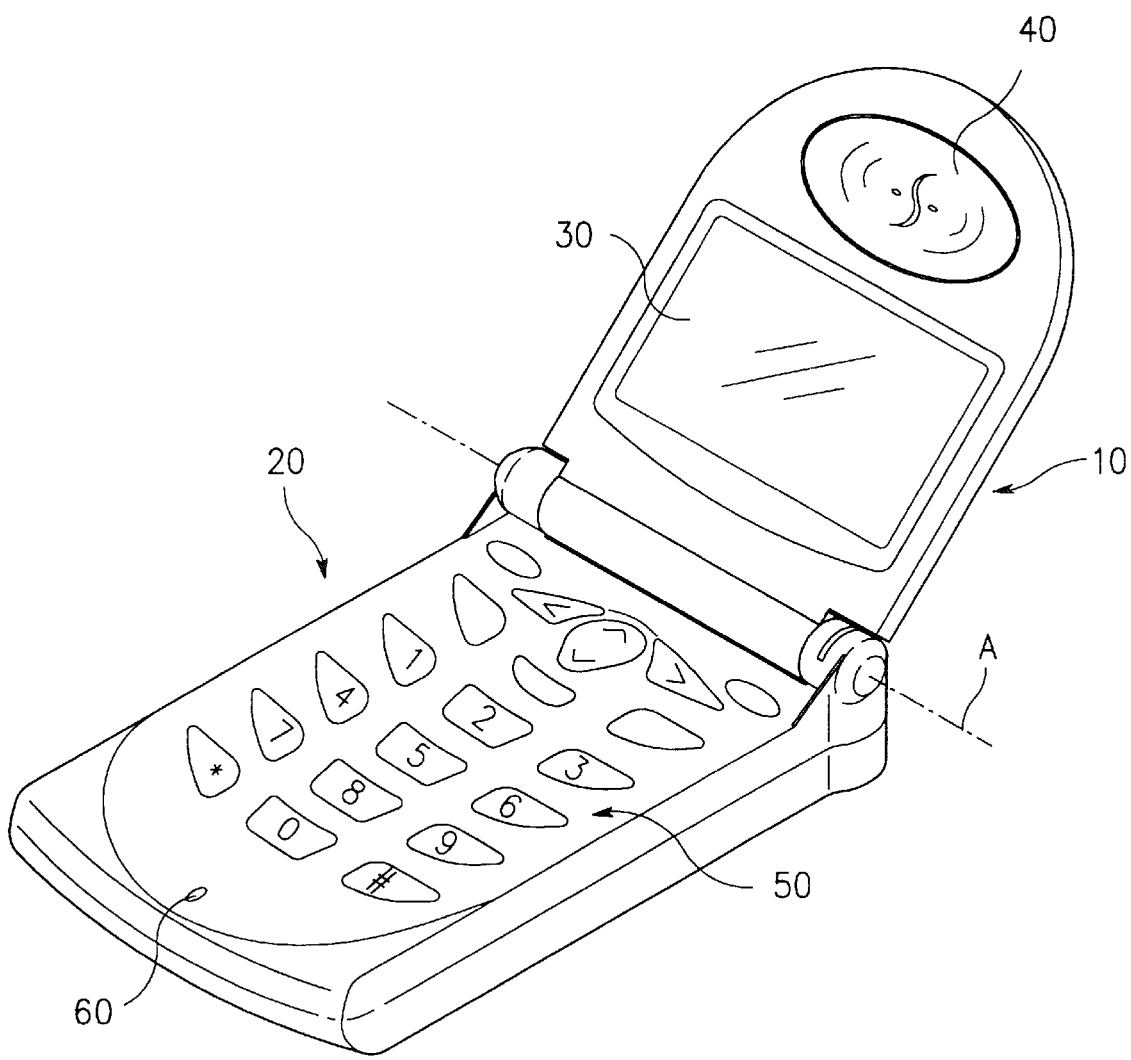
FIG. 2 is a perspective view of the folder type communication terminal according to the embodiment of the present invention, in which the folder is in an open status.
Figure 5A:
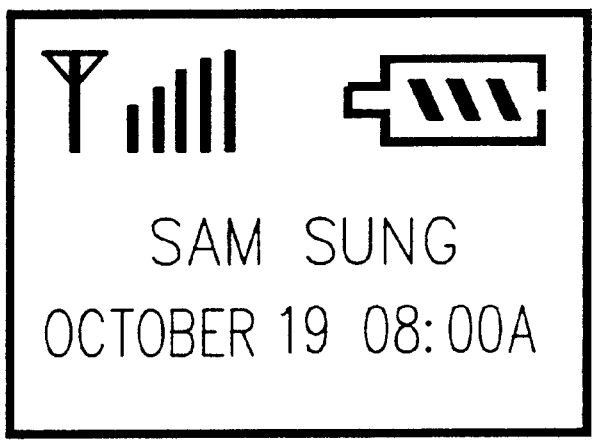
FIGS. 5a and 5b are plan views respectively illustrating images displayed in the case of a folder type communication terminal having a display unit comprised of a transparent LCD and not using a circuit configuration capable of allowing the transparent LCD to display an image in a normal status in both the open and closed status of the folder.
Figure 5B:

FIG. 1 is a perspective view of a folder type communication terminal 100 according to an embodiment of the present invention, in which a folder having a transparent liquid crystal display (LCD) 30 mounted therein, is in a closed status. FIG. 2 is a perspective view of the folder type communication terminal 100 according to the embodiment of the present invention, in which the folder is in an open status. In the following description, the term "the closed status of the folder" means that the folder type communication terminal 100 is folded around a hinge axis A, as shown in FIG. 1, whereas the term "the open status of the folder" means that the folder type communication terminal 100 is unfolded around hinge axis A as shown in FIG. 2. The present invention provides a folder type communication terminal 100 capable of allowing a user to view the display screen of the terminal 100 in both the open and closed status of the folder included in the terminal 100 while using a single display unit. In a preferred embodiment of the present invention, a LCD is used for the display unit. To this end, the folder type communication terminal 100 according to the present invention includes the transparent LCD 30, and an opening formed through the folder 10. The opening has a size equal to the transparent LCD 30. The transparent LCD 30 is mounted in the folder 10 in such a fashion that it is completely exposed at both sides of the folder 10 through the opening. The transparent LCD 30 is a LCD having no reflecting plate. In a conventional LCD, a reflecting plate is attached to the lower surface of the LCD. Such a conventional LCD is opaque and configured to allow the user to view information displayed on only one side of the LCD. However, the transparent LCD 30, which has no reflecting plate, is configured to allow the user to view information displayed on either side of the transparent LCD 30. However, though the transparent LCD 30 allows the displayed information to be viewed at both sides thereof, in a conventional circuit configuration of a folder type communication terminal the displayed information has different image statuses at the different sides of the transparent LCD 30. The image viewed at one side of the transparent LCD 30 has a normal status whereas the image viewed at the other side of the transparent LCD 30 has an inverted status, as shown in FIGS. 5A and 5B. The user will have difficulty understanding the displayed information viewed in an inverted image status. To this end, the present invention provides a technical means capable of solving this problem, which will be described in conjunction with a circuit configuration shown in FIG. 3.

The following description will describe the transparent LCD 30 as having first and second (front and back) display screens, but it should be understood that this is done for ease of description, and in fact, the transparent LCD 30 has only a single, two-sided display screen, which may be viewed from either of its two sides. In a preferred embodiment of the present invention, the front (inner) display screen is viewed in an open status of the folder 10 whereas the rear (outer) display screen is viewed in a closed status of the folder 10.

In the folder type communication terminal 100 shown in FIGS. 1 and 2, the folder 10 can be folded (closed) and unfolded (opened) around the hinge axis A with respect to a body 20. A speaker 40 is disposed at an upper portion of an inner surface of the folder 10, i.e., the surface of the folder 10 exposed to the user when the folder is in an open status. The position of the speaker 40 corresponds to a portion of the communication terminal 100 coming into contact with the ear of the user for conversation through the communication terminal 100. The transparent LCD 30 is disposed below the speaker 40. As mentioned above, the transparent LCD 30 is fixedly mounted in the opening formed through the folder 10 in such a fashion that the display screen thereof may be viewed from both sides of the folder 10. A plurality of keys 50 and a microphone 60 are arranged on an upper surface (front surface) of the body 20.

Figure 3:
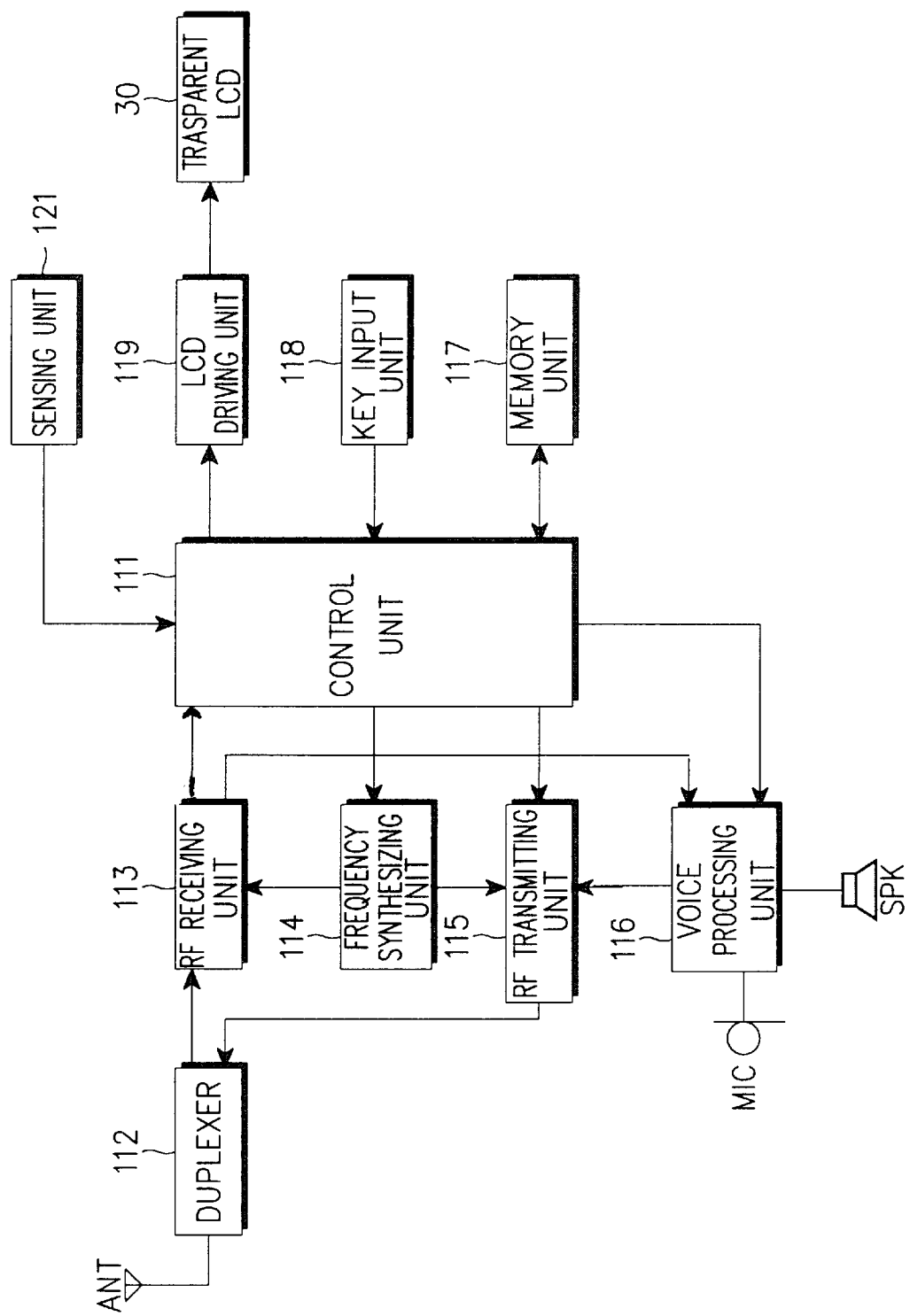
FIG. 3 is a block diagram showing a circuit configuration of the folder type communication terminal according to the embodiment of the present invention.

FIG. 3 is a block diagram showing a circuit configuration of the folder type communication terminal 100 according to a preferred embodiment of the present invention. As shown in FIG. 3, a duplexer 112 transfers signals received by an antenna ANT to a radio-frequency (RF) receiving unit 113 while transmitting signals received from a RF transmitting unit 115 to the antenna ANT. Upon receiving data, the RF receiving unit 113 transfers the received data to a control unit 111. The RF receiving unit 113 also sends voice signals to a voice-processing unit 116 in a communication mode. A frequency synthesizing unit 114 generates a carrier removing signal under the control of the control unit 111, and then transfers it to the RF receiving unit 113. In addition, the frequency-synthesizing unit 114 generates a carrier signal for signal transmission, and then transfers it to the RF transmitting unit 115. The RF transmitting unit 115 synthesizes the signal-transmission carrier signal received from the frequency synthesizing unit 114 with a voice signal received from the voice processing unit 116 under the control of the control unit 111, and then transfers the resultant signal to the duplexer 112. The voice processing unit 116 demodulates an encoded voice signal received from the RF receiving unit 113 under the control of the control unit 111, and then outputs the resultant voice through the speaker SPK. Furthermore, the voice-processing unit 116 encodes an electrical voice signal received from a microphone MIC, and then sends the encoded voice signal to the RF transmitting unit 115. A key input unit 118 has a key matrix array structure (not shown), and generates key input signals corresponding to keys depressed by the user. The key input signals from the key input unit 118 are applied to the control unit 111.

A sensing unit 121 detects whether the folder is open or closed, and sends a detecting signal indicative of the result of the detection to the control unit 111. A memory unit 117 includes a program memory (not shown) for storing a control program required for a control operation of the control unit 111, and a data memory (not shown) for temporarily storing control data generated during operation of the control unit 111. The data memory includes a first display status address region for storing address designating information for allowing an image to be displayed in a normal status on the first (front) display screen of the transparent LCD 30 in the open status of the folder 10, and a second display status address region for storing address designating information for allowing an image to be displayed in a normal image status on the second (back) display screen of the transparent LCD 30 in the closed status of the folder 10. The address designating information stored in the first display status address region of the memory unit 117 and the address designating information stored in the second display status address region of the memory unit 117 are information designating addresses for allowing the LCD 30 to display an image in a normal status in the respective open and closed statuses of the folder 10.

The control unit 111 controls the overall operation of the communication terminal 100. In particular, the control unit 100 controls a display according to the present invention by outputting a LCD drive control signal. The LCD drive control signal serves to designate one of the display status address regions corresponding to the sensing signal from the sensing unit. In response to the LCD drive control signal outputted from the control unit 111 to designate a desired one of the first and second display status address regions in accordance with the detected status of the folder, an LCD driving unit 119 drives the transparent LCD 30 to display an image in a normal status.

The transparent LCD 30 is mounted in the opening formed through the folder 10 as described above. Since the transparent LCD 30 has no reflecting plate, it is possible to view the image displayed on the transparent LCD 30 at both sides, namely, front and back sides, of the transparent LCD 30. The displayed image may include an icon indicative of the intensity of signals received by the terminal 100, a battery icon, and a variety of other information.

Figure 4:
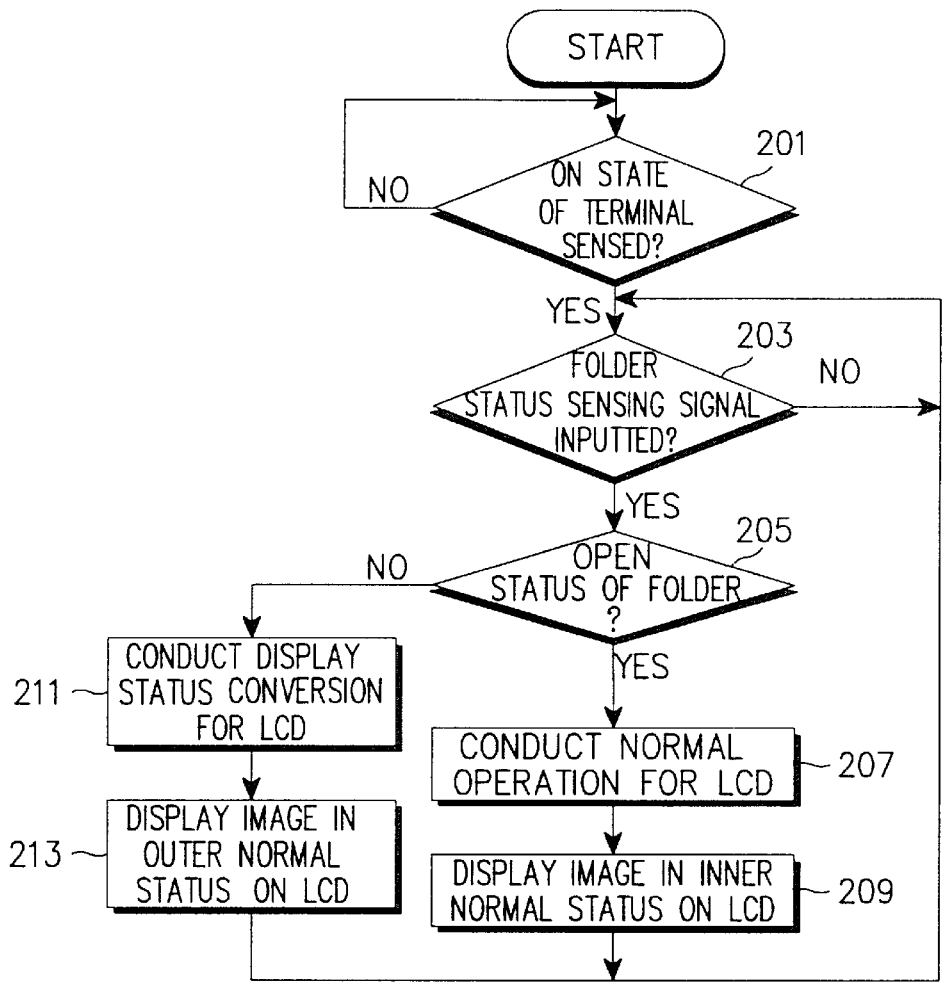
FIG. 4 is a flowchart illustrating a control method for allowing the transparent LCD to display an image in a normal status irrespective of the open or closed status of the folder in the folder type communication terminal in accordance with the present invention.

FIG. 4 is a flowchart illustrating a control method for allowing the LCD to display an image in a normal status irrespective of the open or closed status of the folder in the above mentioned folder type communication terminal 100 in accordance with the present invention.

FIGS. 5a and 5b are plan views respectively illustrating images displayed in the case of a folder type communication terminal 100 having a display unit comprised of a transparent LCD 30 while not using a circuit configuration capable of allowing the LCD to display an image in a normal status in both the open and closed status of the folder. FIG. 5a shows an image displayed in a normal status on the LCD in the open status of the folder, whereas FIG. 5b shows an image displayed in an inverted status on the LCD in the closed status of the folder.

Figure 6A:
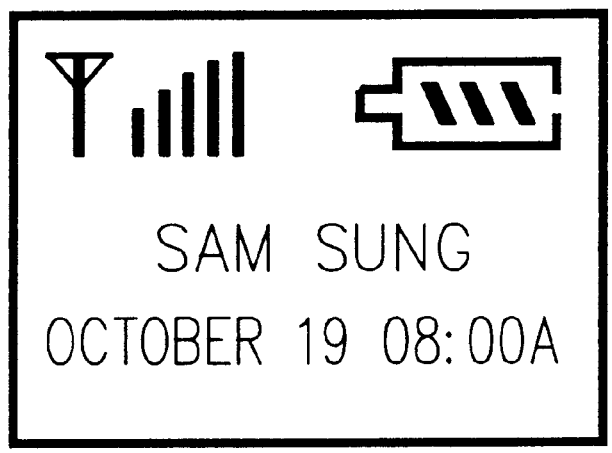
FIGS. 6a and 6b are plan views respectively illustrating images displayed in the case of a folder type communication terminal having a display unit comprised of a transparent LCD and using a circuit configuration capable of allowing the transparent LCD to display an image in a normal status in both the open and closed status of the folder in accordance with the present invention, in which the images displayed on the transparent LCD in the open and closed statuses of the folder have a normal status.
Figure 6B:
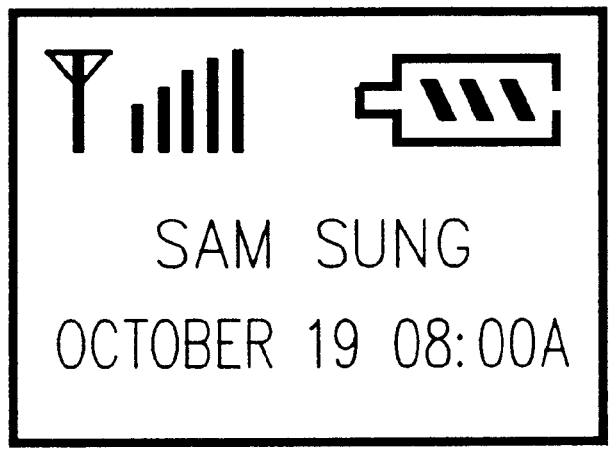

FIGS. 6a and 6b are plan views respectively illustrating images displayed in the case of a folder type communication terminal 100 having a display unit comprised of a transparent LCD 30 while using a circuit configuration capable of allowing the LCD to display an image in a normal status in both the open and closed status of the folder in accordance with the present invention. As shown in FIGS. 6a and 6b, the images respectively displayed on the transparent LCD in both the open and closed statuses of the folder have a normal status.

A method for displaying an image in a normal status on the transparent LCD of the above mentioned folder type communication terminal 100, irrespective of the open or closed status of the folder, in accordance with the preferred embodiment of the present invention will now be described in conjunction with FIGS. 1 to 4.

At step 201 of FIG. 4, the control unit 111 detects whether or not the terminal 100 is in the ON state. If it is determined that the terminal 100 is in the ON state, step 203 is then carried out. Otherwise, control returns to step 201. At step 203, the control unit 111 checks whether or not a folder status-detecting signal is generated from the sensing unit 121. Once it is determined that a folder status detecting signal is generated from the sensing unit 121, the control unit 111 then determines whether the folder 10 is open or closed, based on the folder status detecting signal, at step 205. If the control unit 111 identifies at step 205 that the folder 10 is in the open status, the process proceeds to step 207. If the control unit 111 identifies at step 205 that the folder 10 is in the closed status, the process proceeds to step 211.

At step 207, the control unit 111 transfers a drive control signal to the LCD driving unit 119 in order to allow the LCD driving unit 119 to conduct a normal display status operation for the transparent LCD 30. Information corresponding to an image to be displayed on the first display screen of the transparent LCD 30 is read from the first display status address region designated in accordance with the open status of the folder 10. Thereafter, the image corresponding to the read information is displayed on the first display screen of the transparent LCD 30 at step 209. At this time, the image displayed on the first display screen of the transparent LCD 30 is in the normal status.

On the other hand, when the control unit 111 carries out step 211 after identifying that the folder 10 is in the closed status, it transfers an LCD driving signal to the LCD driving unit 119 to direct the LCD driving unit 119 to conduct a status inverting operation for the LCD. Here, the term "status inverting operation" means that the display status address region is switched from the first display status address region to the second display status address region, containing information for an inverted display of the image displayed in the open status of the folder 10. At step 211, the control unit 111 transmits the LCD drive control signal corresponding to the closed status of the folder 10 to the LCD driving unit 119. Then, the control unit 111 carries out step 213. That is, address information corresponding to an image to be displayed on the second (outer) display screen of the transparent LCD 30 is read from the second display status address region designated in accordance with the open status of the folder 10. Thereafter, the image corresponding to the read address information is displayed on the second display screen of the transparent LCD. At this time, the image displayed on the second display screen of the LCD 30 is in its normal status. The normal status of the image displayed in the closed status of the folder 10 is referred to as an "outer normal status" so that it is distinguished from the "inner normal status", that is, the normal status of the image displayed in the open status of the folder 10.

In the case of a folder type communication terminal 100 having a display unit comprised of a transparent LCD 30 while not using a circuit configuration capable of allowing the transparent LCD 30 to display an image in a normal status in both the open or closed status of the folder, the image displayed on the transparent LCD 30 has a normal status only in a selected one of the open and closed statuses of the folder. For example, when this folder type communication terminal 100 is configured to allow the image displayed on the LCD to have a normal status in the open status of the folder, as shown in FIG. 5a, it has an inverted status in the closed status of the folder, as shown in FIG. 5b. It is therefore difficult for the user to understand the image displayed in an inverted status on the transparent LCD 30 in the closed status of the folder. However, the folder type communication terminal 100 according to the present invention solves this problem because it uses a circuit configuration capable of allowing the transparent LCD 30 to display an image in a normal status in both the open and closed status of the folder, as shown in FIGS. 6a and 6b. In accordance with the present invention, therefore, the user can easily understand the image displayed on the transparent LCD 30 in both the open and closed status of the folder.

The circuit configuration of FIG. 3 may be modified according to a second embodiment of the present invention, while accomplishing the purpose of the present invention in allowing the transparent LCD 30 to display an image in a normal status both in the open and closed status of the folder 10. For example, the memory unit 117 may have a single address region for storing address designating information associated with an image to be displayed, as in the prior art. In this case, the address designating information associated with the image to be displayed is converted by the control unit 111 in accordance with the open or closed status of the folder 10. While the image displayed has a normal status when the folder 10 is in the open status, the control unit 111 converts the address information read from the address region in response to the closed status of the folder 10 detected thereby in such a fashion that the image displayed in the closed status of the folder 10 has a normal status. The control unit 111 can accomplish the conversion of the address information in various ways, using an appropriate conversion program stored in firmware or software within the memory unit 117. For example, a coordinate conversion program for address designating information may be used. With this coordinate conversion method, if the open status of the folder 10 is a reference status of the co-ordinate conversion, the control unit 111 converts the Y-axis value of the address information into a corresponding negative value in response to the closed status of the folder 10 and displays the information on the displaying surfaces of the transparent LCD 30. In this state, the image displayed on the transparent LCD 30 is viewed in a normal status on the second (outer) display screen of the transparent LCD 30 corresponding to the closed status of the folder 10. At this time, the image displayed on the transparent LCD 30 is displayed in an inverted status on the first (inner) display screen of the transparent LCD 30. However, this presents no problem, as the folder is in the closed status. As is apparent from the above description, the coordinate conversion method converts the coordinate value of the address information associated with the image to be displayed, in accordance with a direction of viewing the LCD in the open or closed status of the folder 10. It is obvious to a person skilled in the art to which the present invention pertains that the address designating information can be converted in the control unit 111 using other methods, involving simple software changes known to the art which require no further description.

A method for displaying an image in a normal status on the transparent LCD 30 of the folder type communication terminal 100, in both the open and closed status of the folder, in accordance with the second embodiment of the present invention will now be described. This embodiment is associated with the circuit configuration of FIG. 3 in which the control unit 111 is adapted to carry out an address conversion in software or firmware, as described above.

In accordance with this method, the control unit 111 carries out the same control operations as those of steps 201 to 205 in FIG. 4. At step 205, when the control unit 111 detects the fact that the folder 10 is in the open status, it drives the LCD driving unit 119 while reading address information, associated with an image to be displayed, from the address region of the memory 117, thereby causing the image to be displayed on the LCD based on the read address information. These operations are similar to those in the displaying method used in conventional folder type communication terminals 100 configured to allow the image displayed on an LCD to be viewed in only one direction. When the control unit 111 detects the closed status of the folder 10 at step 205, it reads address information, associated with an image to be displayed, from the address region of the memory 117, and then converts the read address information in accordance with an address conversion program (for example, an address coordinate conversion program) so that the image is displayed in a normal status on the transparent LCD 30 in the closed status of the folder 10. Based on the converted address information, the control unit 111 controls the LCD driving unit 119, thereby causing the image to be displayed in a normal status on the transparent LCD 30.

In both embodiments of the present invention, the image in the open status of the folder is displayed in a normal status on the first (inner) display screen of the transparent LCD 30 while being displayed in an inverted status on the second (outer) display screen of the transparent LCD 30. In the closed status of the folder, the image is displayed in an inverted status on the first (inner) display screen of the transparent LCD 30 while being displayed in a normal status on the second (outer) display screen of the transparent LCD 30.

As is apparent from the above description, the present invention provides a folder type communication terminal 100 having a display unit comprised of a transparent LCD 30 fixedly mounted in an opening formed through a folder 10 while using a configuration capable of allowing the transparent LCD 30 to display an image in a normal status in either the open or closed status of the folder 10. In order to allow the image displayed on the transparent LCD 30 to be viewed in a normal status irrespective of the direction of viewing the transparent LCD 30, there are two display control methods according to the present invention. In accordance with the first display control method, a control unit 111 controls a memory unit which includes a first display status address region stored with address designating information for allowing an image to be displayed in a normal status on the transparent LCD 30 in an open status of the folder 10, and a second display status address region stored with address designating information for allowing an image to be displayed in a normal status on the transparent LCD 30 in a closed status of the folder 10. In accordance with this method, a selected one of the display status address regions is designated in accordance with the open or closed status of the folder 10 sensed by a folder-sensing unit 121. In accordance with the second display control method, a memory unit 117 is used which includes a single memory region. When the folder sensing unit 121 senses the open or closed status of the folder 10, the control unit 111 reads address information, associated with an image to be displayed, from the single memory region irrespective of the sensed open or closed status of the folder 10. The address information is then converted in accordance with an address conversion program, in response to the sensed open or closed status of the folder 10, in order to allow the transparent LCD 30 to display the image in a normal status in both the open and closed status of the folder.

The present invention advantageously allows a user to view the image displayed on a single display unit mounted to the folder 10 of a folder type communication terminal 100, without opening the folder 10.

The present invention has another advantage in that since the displaying unit mounted to the folder 10 has a transparent structure capable of allowing the image displayed on the displaying unit to be viewed at both sides of the displaying unit, the user can view the displayed image in either the open or closed status of the folder.

The present invention has a further advantage of providing an apparatus and method for displaying information in a folder type communication terminal 100 configured to allow the user to view information displayed in either the open or closed status of the folder of the terminal 100, such apparatus and method being capable of displaying information in the form of a normal-status image in both the open and closed status of the folder 10 while using a single display unit mounted to the folder 10.

While the present invention has been particularly shown and described with reference to a particular embodiment thereof, it will be understood by those skilled in the art that various changes in form and detail may be effected therein without departing from the scope of the invention as defined by the appended claims. For example, a transparent LCD may be disposed in an opening formed through the body of a flip type communication terminal. In this case, when the flip covers the transparent LCD, the present invention would provide a normal view from the side of the LCD not covered by the flip. When the flip is opened, the present invention would provide a normal view of the transparent LCD from the side of the LCD previously covered by the flip, and such would be within the scope of the present invention.

What is claimed is:

1. An apparatus for displaying information in a folder type communication terminal, comprising:

a sensing unit for detecting whether a folder of the communication terminal is open or closed, and for generating a sensing signal according to the sensed status of the folder; a display unit mounted in an opening formed through a portion of the folder, the display unit being transparent at both surfaces thereof;

a memory unit for storing in a first address region a first display address designating information to allow an image to be displayed in a normal status on the display unit in an open state of the folder, and for storing in a second address region a second display address designating information to allow the image to be displayed in an inverted status on the display unit in a closed state of the folder;

a control unit for selecting one of the first and second display address designating information from either the first or second address regions, which are continuously maintained in the memory unit, based on the sensing signal from the sensing unit, to allow the image to be displayed on the display unit in one of the open and closed states of the folder; and a driving unit for driving the display unit under the control of the control unit.

2. A method for displaying information in a folder type communication terminal including a folder, a sensing unit for detecting whether the folder is open or closed, and a transparent display unit mounted in an opening formed through the folder, the transparent display unit having a first display screen for displaying an image in an open status of the folder and a second display screen for displaying the image in a closed status of the folder, comprising the steps of:

detecting, by the sensing unit, whether the folder is open or closed;

controlling, based on the result of the detection, the operation of a speaker, a microphone, and a key input unit;

controlling the display unit, based on the result of the detection, by designating an address designation of the first display screen or the second display screen from either first or second address regions, which are continuously maintained in a memory unit, in such a fashion that when the folder is in its closed status the image is displayed in an inverted status on the first display screen while being displayed in a normal status on the second display screen; and displaying the image on the display unit.

3. The method as claimed in claim 2, further comprising the step of:

controlling the display unit, based on an address designation of the first display screen or the second display screen, in such a fashion that when the folder is in its open status the image is displayed in a normal status on the first display screen while being displayed in an inverted status on the second display screen.

4. A method for displaying information in a folder type communication terminal including a memory, a folder, a sensing unit for detecting whether the folder is open or closed, and a transparent display unit mounted in an opening formed through the folder, the transparent display unit having a first display screen for displaying an image in an open status of the folder and a second display screen for displaying the image in a closed status of the folder, comprising the steps of:

detecting, by the sensing unit, whether the folder is open or closed;

controlling, based on the result of the detection, the operation of a speaker, a microphone and a key input unit;

storing in a first address region of the memory a first display address designation information associated with the first display screen and storing in a second address region a second display address designating information associated with the second display screen, based on the result of the detection, wherein the first and second address regions are continuously maintained in the memory;

displaying, based on the address designation, the image in a normal status on the first display screen of the display unit when it is determined that the folder is open; and displaying, based on the address designation, the image in a normal status on the second display screen of the display unit when it is determined that the folder is closed.

5. A method for displaying information in a folder type communication terminal including a sensing unit for detecting whether a folder of the communication terminal is open or closed, a display unit mounted in an opening formed through a portion of the folder, the display unit being transparent at both surfaces thereof, a memory unit including a first address region for storing address designating information to allow an image to be displayed in a normal status on the display unit in an open status of the folder, and a second address region for storing address designating information to allow the image to be displayed in a normal image status on the display unit in a closed status of the folder, comprising the steps of:

detecting, by the sensing unit, whether the folder is open or closed;

selecting one of the first address region and the second address region, which are continuously maintained in the memory unit, based on the result of the detection, in such a fashion that the image is displayed in a normal status; and reading the address designating information from the selected address region and controlling the display unit, based on the read address information, to display the image in a normal status.

* * * * *